(12) United States Patent
Chiu et al.

(10) Patent No.: US 7,392,872 B2
(45) Date of Patent: Jul. 1, 2008

(54) POWER ASSISTED VEHICLE

(76) Inventors: Po-Lin Chiu, No. 135, Li da Rd., Zuoyung District, Kaohsiung City 813 (TW); Shern-Ji Tsay, No. 33, Lane 109, Nenjiang st., Sanmin District, Kaohsiung City 807 (TW); Ching-Piao Chang, No. 309, Lane 529, Wujia 2$^{nd}$ Rd., Fongshan city, Kaoshiung Country 830 (TW)

( * ) Notice: Subject to any disclaimer, the term of this patent is extended or adjusted under 35 U.S.C. 154(b) by 16 days.

(21) Appl. No.: 11/469,469

(22) Filed: Aug. 31, 2006

(65) Prior Publication Data
US 2008/0053724 A1    Mar. 6, 2008

(51) Int. Cl.
*B60K 1/02*    (2006.01)
(52) U.S. Cl. .................. 180/65.5; 180/65.1; 180/DIG. 5
(58) Field of Classification Search .......... 180/65.5, 180/DIG. 5, 65.1
See application file for complete search history.

(56) References Cited

U.S. PATENT DOCUMENTS

| | | | | |
|---|---|---|---|---|
| 5,375,673 A * | 12/1994 | McCall et al. | ................ | 180/13 |
| 5,749,424 A * | 5/1998 | Reimers | ................... | 180/19.2 |
| 6,382,334 B1 * | 5/2002 | Agutter et al. | ............. | 180/19.1 |
| 6,481,518 B1 * | 11/2002 | Wu | ............................ | 180/65.6 |
| 6,662,887 B2 * | 12/2003 | Agutter | ........................ | 180/11 |
| 7,237,632 B2 * | 7/2007 | Liao | ........................ | 180/19.3 |
| 2006/0207814 A1 * | 9/2006 | Tseng | ........................ | 180/65.5 |
| 2006/0249320 A1 * | 11/2006 | Carter et al. | ................ | 180/65.5 |
| 2007/0131465 A1 * | 6/2007 | Garceau | .................... | 180/65.5 |

* cited by examiner

*Primary Examiner*—Jeffrey J Restifo
(74) *Attorney, Agent, or Firm*—Banger Shia (57) ABSTRACT

A power assisted vehicle includes an auxiliary propelling device disposed to the frame body. The auxiliary propelling device has an auxiliary wheel and at least one transmission portion disposed in the auxiliary wheel. When two friction wheels of the transmission portion fasten to two sides of a friction ring of the auxiliary wheel, and the two power sources is in reverse to drive the two friction wheels for rotating, a wheel rim and a tire are further driven to produce rotations. The power assisted vehicle is therefore capable of self-propelled going forward without any external force. A processing device is further disposed in the power assisted vehicle. The auxiliary propelling device is then activated when the power assisted vehicle is at a specific speed. The energy consumption for the power sources is then reduced and the service life is extended. The transmission force distribution generated from the power sources is further adjustable. The usage of the power assisted vehicle is more efficient.

3 Claims, 8 Drawing Sheets

POWER ASSISTED VEHICLE

BACKGROUND OF THE INVENTION

1. Field of the Invention

The present invention generally relates to a vehicle design, more particular to this vehicle is equipped with an auxiliary propelling device and an electric motor for powering the power assisted vehicle.

2. Description of the Related Art

Conventional electric vehicles and light transportations usually rely on electric motors to transmit powers. For designing traditional motors, external gears, belts are utilized to drive tires for rotating. However, the speeds for those transportations are to regulate voltages to achieve. The regulation may consume electricity and torsions generated by motors may be easily affected by the available capacity remaining in batteries. For any type of transmission mechanism, the precision requirement is really high and the noise is quite loud. The transmission mechanism may also have larger volume and weight.

To overcome the foregoing shortcomings, the inventor of the present invention based on years of experience in the related field to conduct extensive researches and experiments, and finally invented a power assisted vehicle as a method or a basis for achieving the aforementioned objective.

SUMMARY OF THE INVENTION

Accordingly, it is an objective of the present invention to provide a power assisted vehicle that is capable of self-propelled going forward, reduces the consumption on powers provided by batteries, and improves transmission efficiency.

The power assisted vehicle comprises a frame body, a pushing handlebar pivoted to the frame body, a wheel portion and an auxiliary propelling device. The auxiliary propelling device includes an auxiliary wheel and at least one transmission portion disposed in the auxiliary wheel. When two friction wheels of the transmission portion fasten to two sides of a friction ring of the auxiliary wheel and the two power sources is in reverse to drive the two friction wheels for rotating, a wheel rim and a tire are then driven to produce rotations. The power assisted vehicle is therefore capable of self-propelled going forward only push it at a specific speed by user. A processing device is further installed in the power assisted vehicle. The auxiliary propelling device is then activated when the power assisted vehicle is at a specific speed. The energy consumption for the power source is reduced and increased transporting efficiently and regulated the power sources distribution for powering the power assisted vehicle. The usage of the power assisted vehicle is more efficient.

To make it easier for our examiner to understand the objective of the invention, its innovative features and performance, a detailed description and technical characteristics of the present invention are described together with the drawings as follows.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENTS

Wherever possible, the same reference numbers are used in the drawings and the description to refer to the same or like parts.

Referring to the related figures for the power assisted vehicle according to a preferred embodiment of the present invention, wherein the same elements are described by the same reference numerals.

Figure 1:
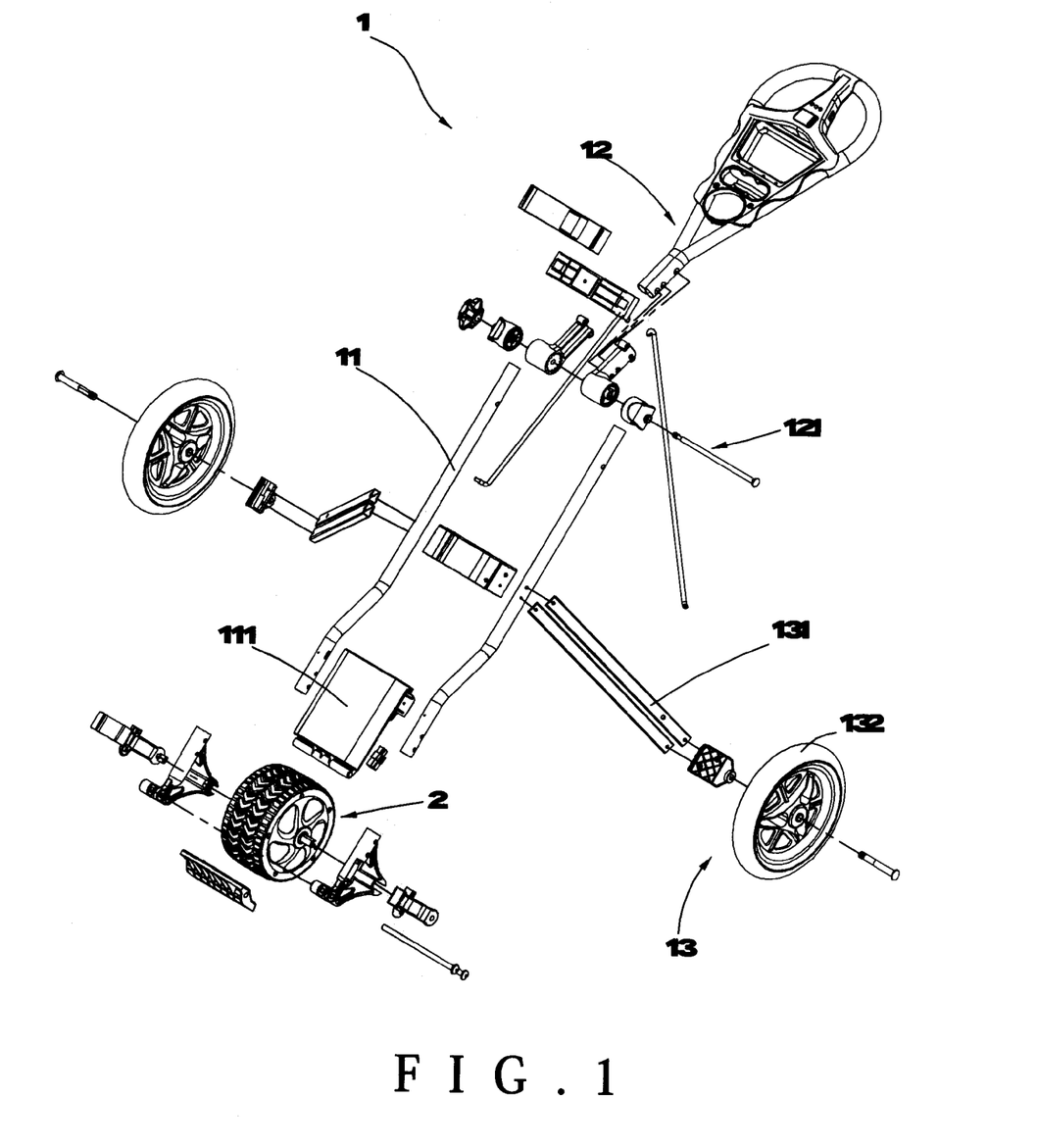
FIG. 1 is an exploded assembly drawing of a power assisted vehicle according to a preferred embodiment of the present invention.

Referring to FIG. 1, an exploded assembly drawing of a power assisted vehicle according to a preferred embodiment of the present invention. The power assisted vehicle 1 comprises a frame body 11, a pushing handlebar 12 pivoted to the frame body 11, a wheel portion 13 disposed on the frame body 11 and an auxiliary propelling device 2. An external power 111 (e.g. a battery) is disposed on the frame body 11. The external power 111 can be easily replaced to keep power supplied by the external power 111. In addition, a pivot point between the pushing handlebar 12 and the frame body 11 having a positioning member 121 (e.g. screws screwed to nuts as shown in FIG. 1). The pushing handlebar 12 is folded by loosening or by tightening the positioning member 121. The pushing handlebar 12 is unfolded as shown in the embodiment. The wheel portion 13 has two fastening frames 131 pivoted to the frame body 11 and driven wheels 132 disposed to the fastening frames 131.

Figure 2:
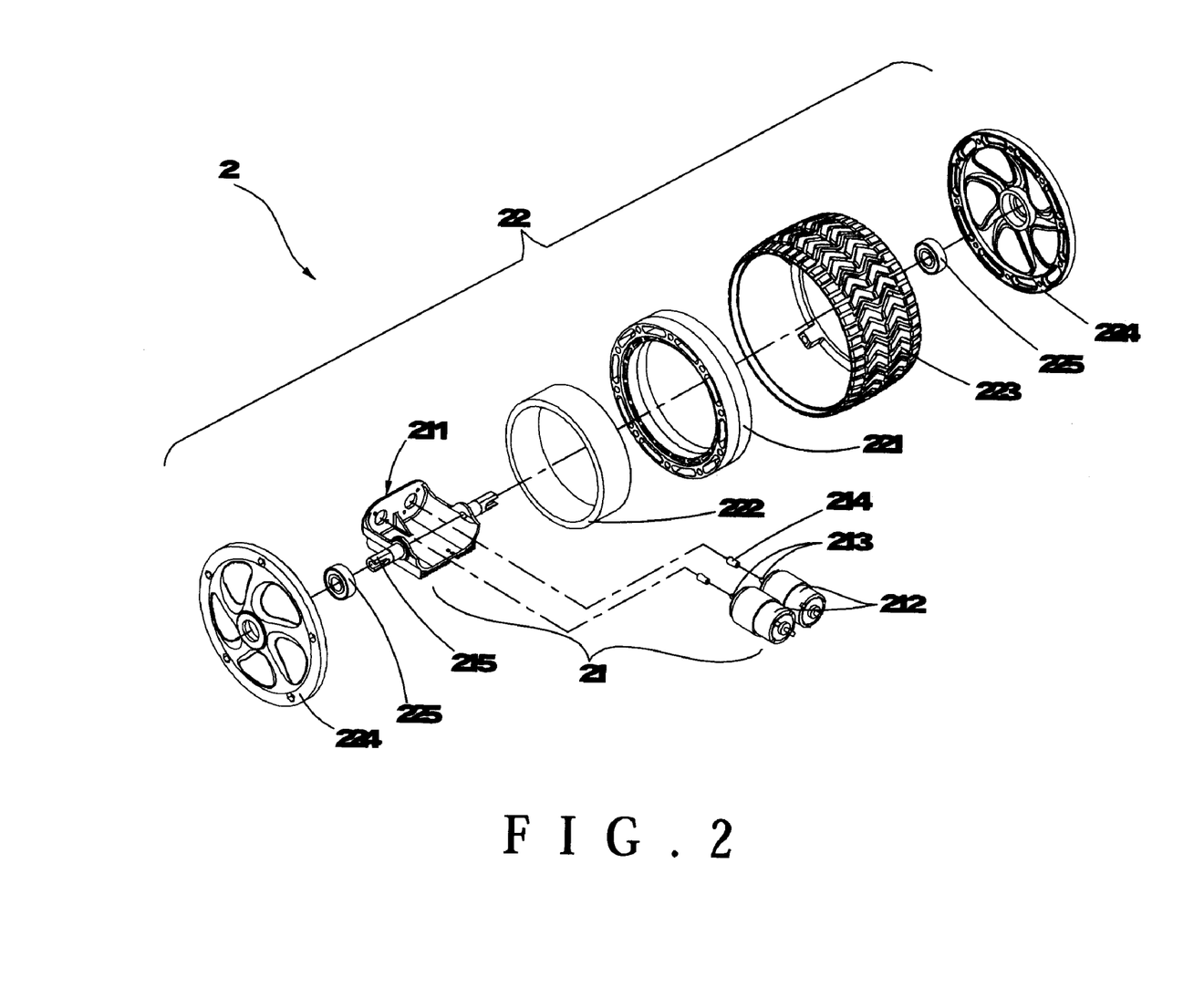
FIG. 2 is an exploded assembly drawing of the auxiliary propelling device of the present invention.
Figure 3:
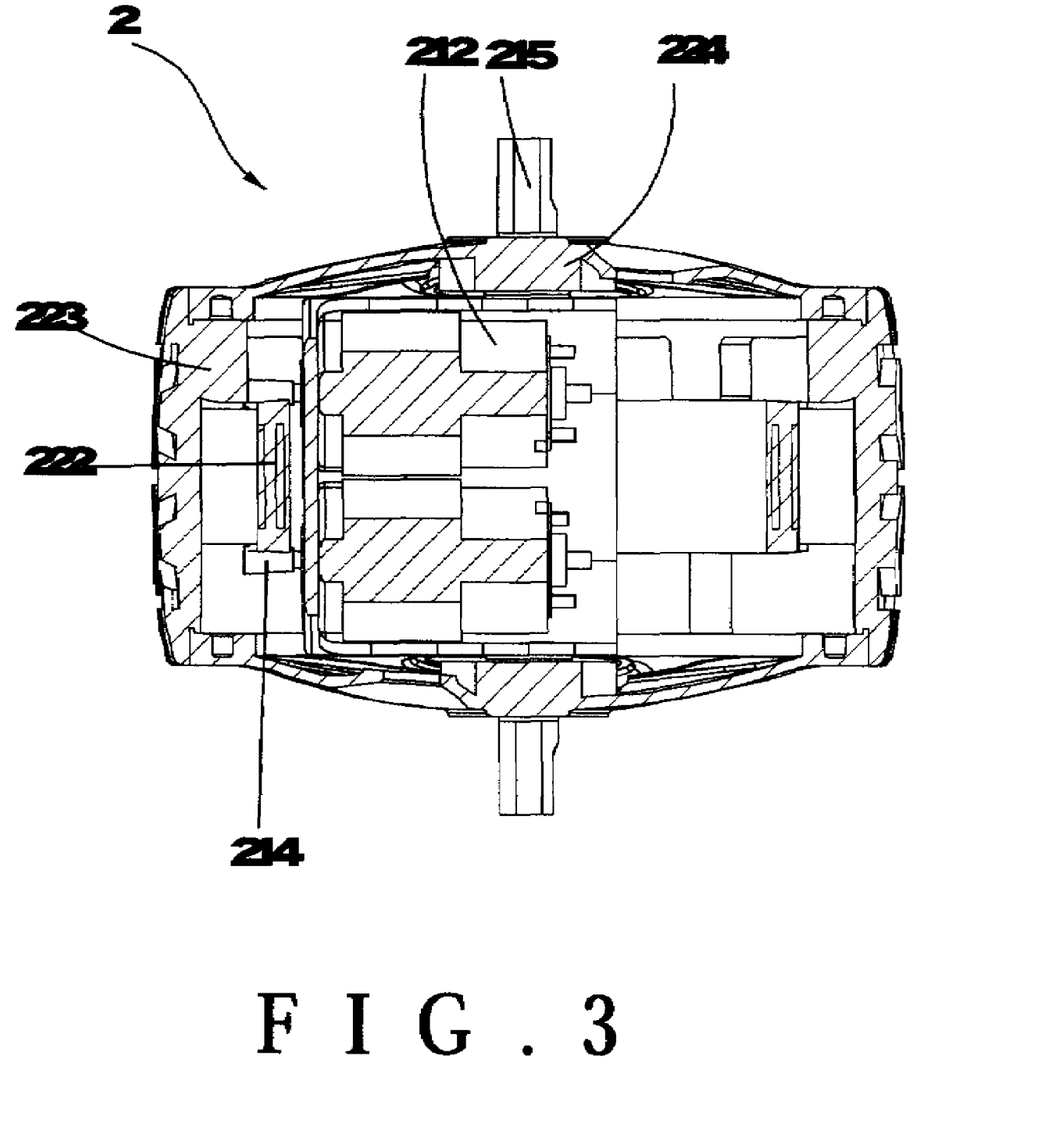
FIG. 3 is a cross-sectional drawing of the auxiliary propelling device of the present invention.

Referring to FIG. 2 and FIG. 3, shown an auxiliary propelling device 2 preferable configured with downwardly depending on the frame body 11. The auxiliary propelling device 2 has a transmission portion 21 disposed on the frame body 11 and an auxiliary wheel 22 driven by the transmission portion 21. The transmission portion 21 can be disposed by at least two sets. There is only one set shown in the embodiment. The transmission portion 21 includes a supporting base 211 disposed on the frame body 11; two power sources 212 (e.g. motors as shown in FIG. 2) disposed on the supporting base 211, a transmission shaft 213 protruded from each power source 212 and a friction piece 214 disposed on each transmission shaft 213. Two sides of the supporting base 211 having protruded to fastening shafts 215. The fastening shaft 215 is a precision aluminum die-casting that can be fastened on the frame body 11. Moreover, the two power sources 212 are electrically connected to the external power 111. The two power sources 212 then drive the transmission shafts 213 for rotating. Meanwhile, the two power sources 212 turning different rotation directions to allow the two friction pieces 214 to have different rotation directions.

Figure 4:
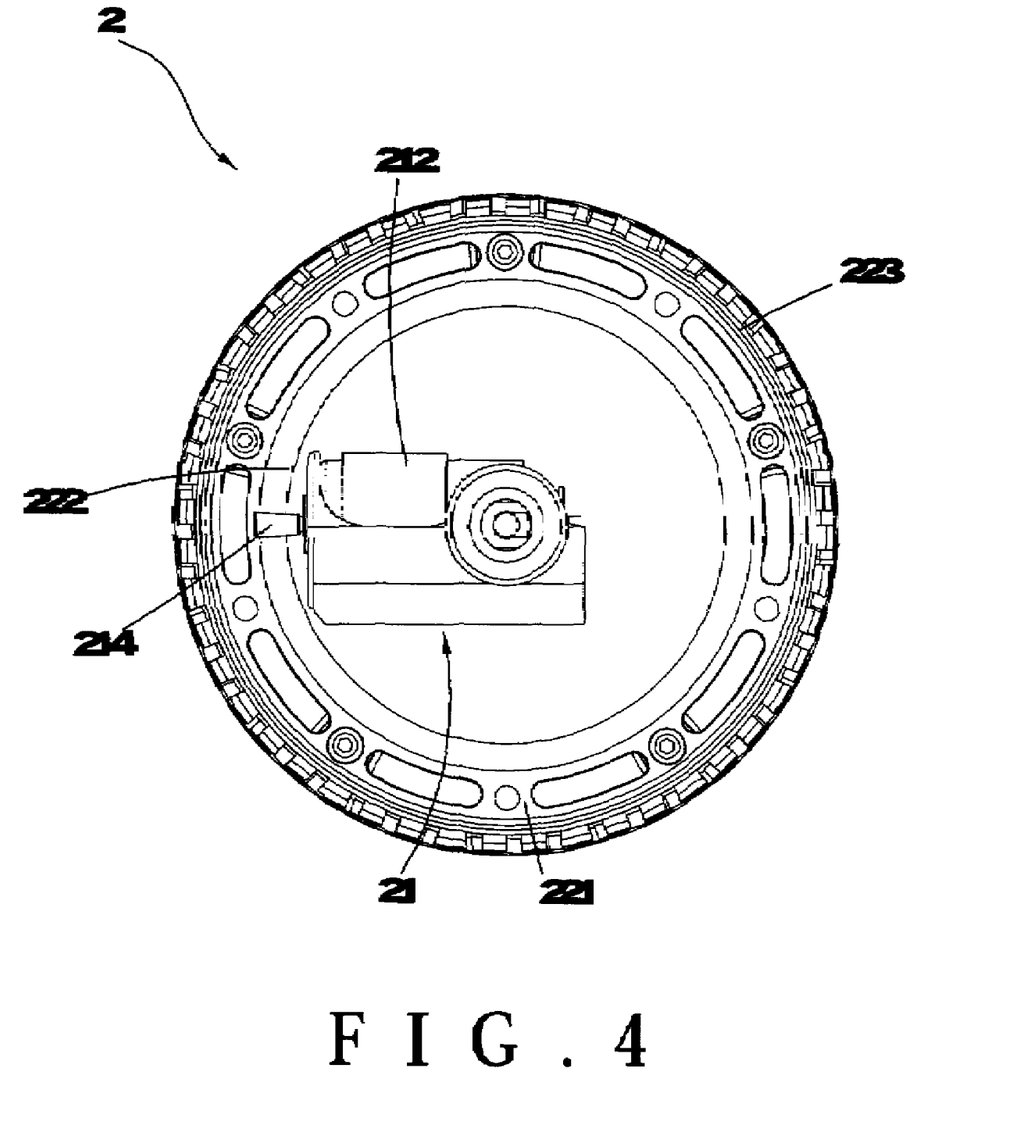
FIG. 4 is a schematic diagram of the auxiliary propelling device of the present invention.

Referring to FIG. 4, the auxiliary wheel 22 includes a wheel rim 221 surrounded the outside of the supporting base 211, a friction ring 222 fastened on the wheel rim 221, a tire 223 fastened on the wheel rim 221 and reversed to the friction ring 222, wherein cover bodies 224 covered with two sides of the wheel rim 221. After the cover bodies 224 cover with the wheel rim 221, the transmission portion 21 is then fastened into the wheel rim 221 to improve waterproof and dustproof performances. Moreover, the cover bodies 224 are pivoted to the fastening shafts 215. To help the rotation of the wheel rim 221; a bearing 225 is disposed between the wheel rim 221 and the fastening shafts 215. In addition, the friction ring 222 is a flexible material with wear resistance. Two sides of the friction ring 222 secured with the friction pieces 214. Powers supplied by the power sources 212 then drive the friction ring 222, the wheel rim 221 and the tire 223 for synchronously rotating through the friction pieces 214.

Figure 5:
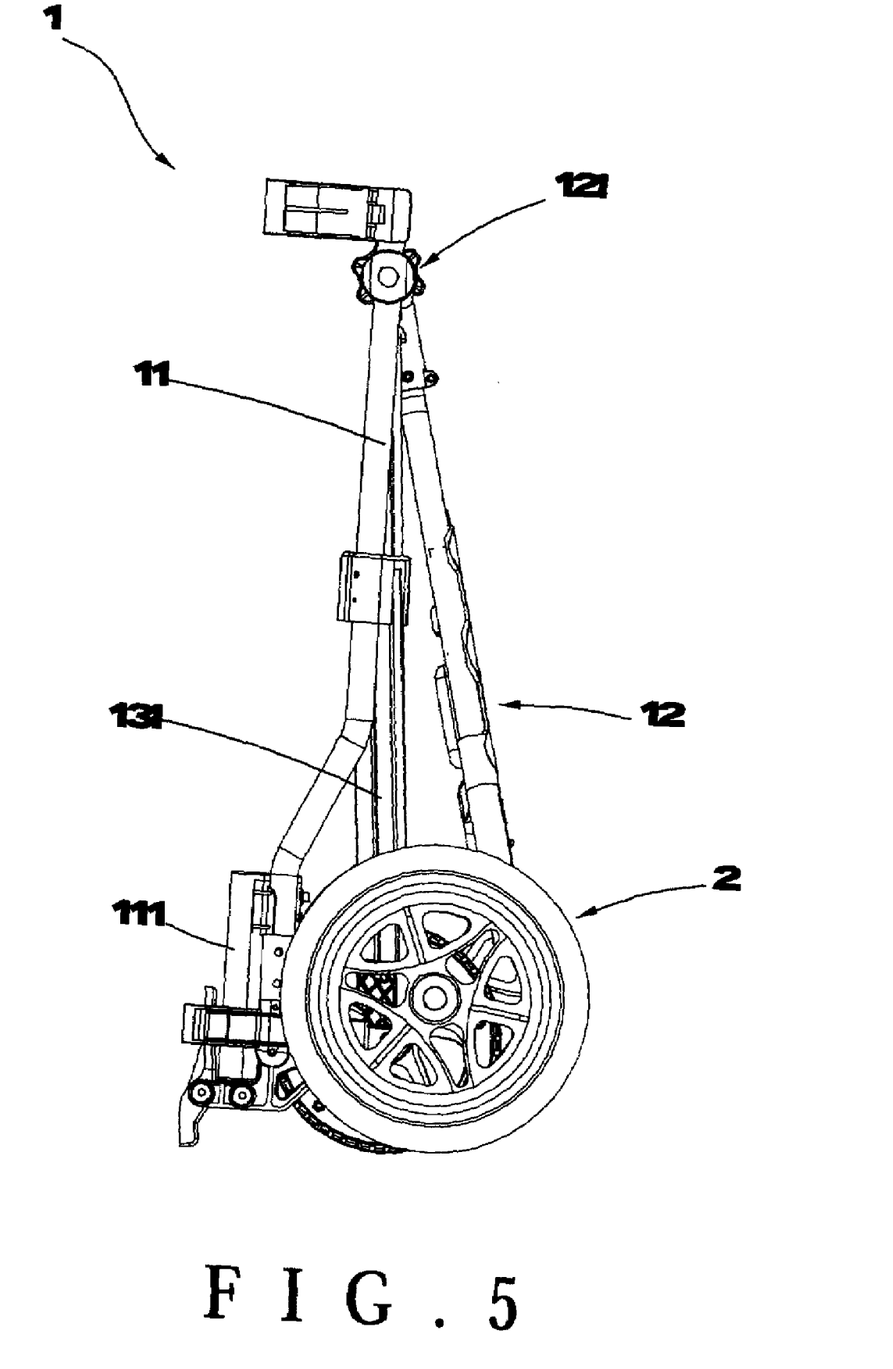
FIG. 5 is a schematic diagram of the power assisted vehicle after folding according to a preferred embodiment of the present invention.
Figure 6:
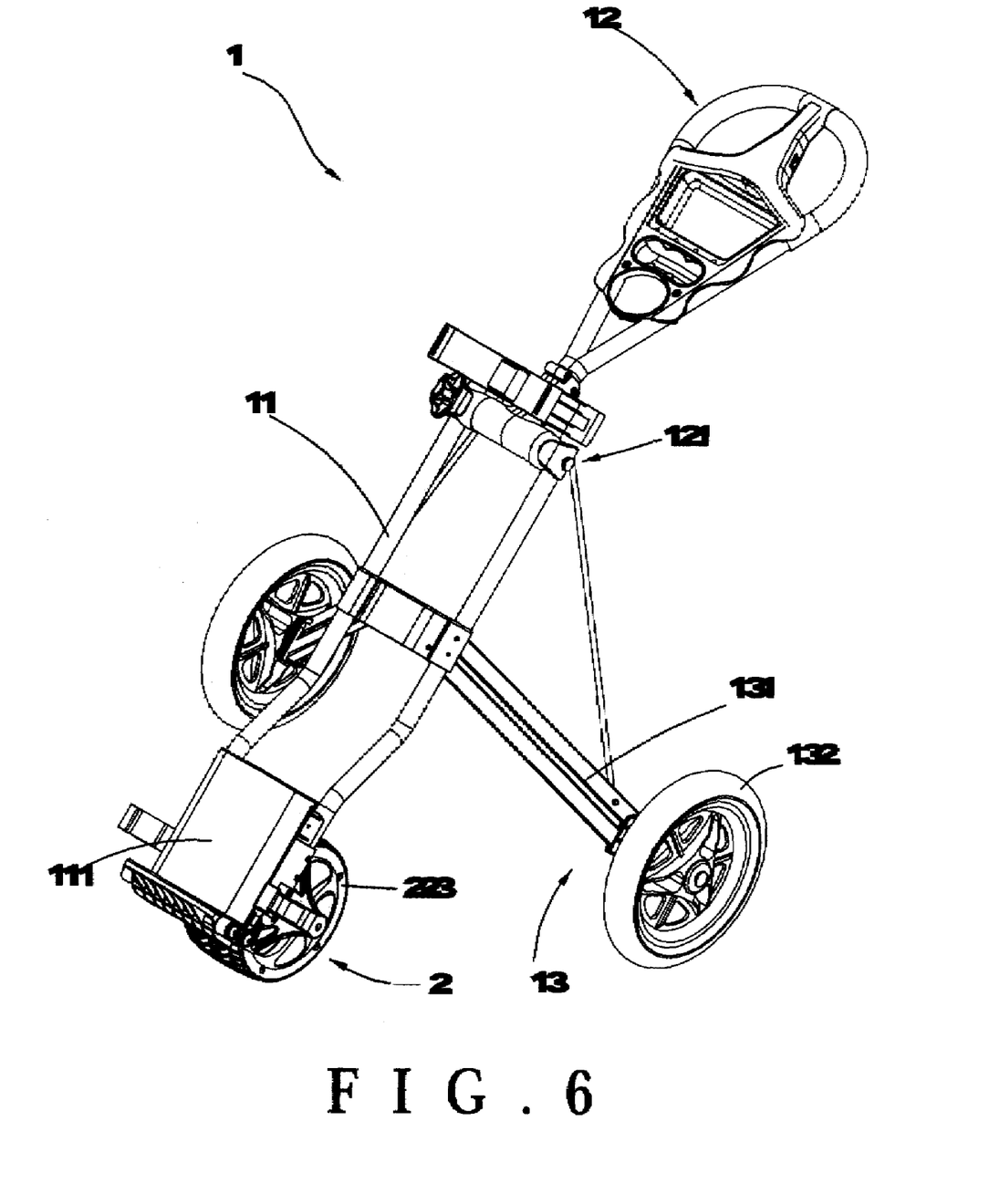
FIG. 6 is a pictorial drawing of the power assisted vehicle according a preferred embodiment of the present invention.

Referring to FIG. 5, firstly, before using the power assisted vehicle 1, the pushing handlebar 12 is folded downward and leans against the frame body 11 by loosening the positioning member 121. The fastening frames 131 is then driven to approach the frame body 11 as shown in FIG. 5. Therefore, the power assisted vehicle 1 can be easily stored. While using the power assisted vehicle 1, the pushing handlebar 12 is lifted. The power assisted vehicle 1 is then expanded as shown in FIG. 6. Before the power assisted vehicle 1 performs self-propelled going forward, a thrust pushes the power assisted vehicle 1. The tire 223 sequentially drives the wheel rim 221, the friction ring 222 and the transmission shafts 213 for rotating. Next, by incorporating with two power sources 212, the tire 223 then rotates backward as driven by two power sources 212. In another word, when two power sources 212 transmit powers, the friction ring 222 is clipped through two power sources 212. Hence, one power source 212 rotates clockwise and the other power source 212 rotates counterclockwise to avoid shake generated by the friction ring 222 while rotating. The transmission loss of the power assisted vehicle 1 is then decreased to the minimum. When current is increased for one power source 212, current is then decreased for the other power source 212. Current consumption can be steadied. There is no unstable load current for the power sources 212 due to the shaking of the friction ring 222. The service life of the power sources 212 and the speed of the power assisted vehicle 1 would not be influenced. Greater voltages required for activating the power sources 212 are further overcome when the power assisted vehicle 1 starts going forward from a stop state. The power consumption of the external power 111 is also decreased to the minimum. Therefore, the transmission efficiency is improved and the consumption of battery capacity is decreased.

Figure 7:
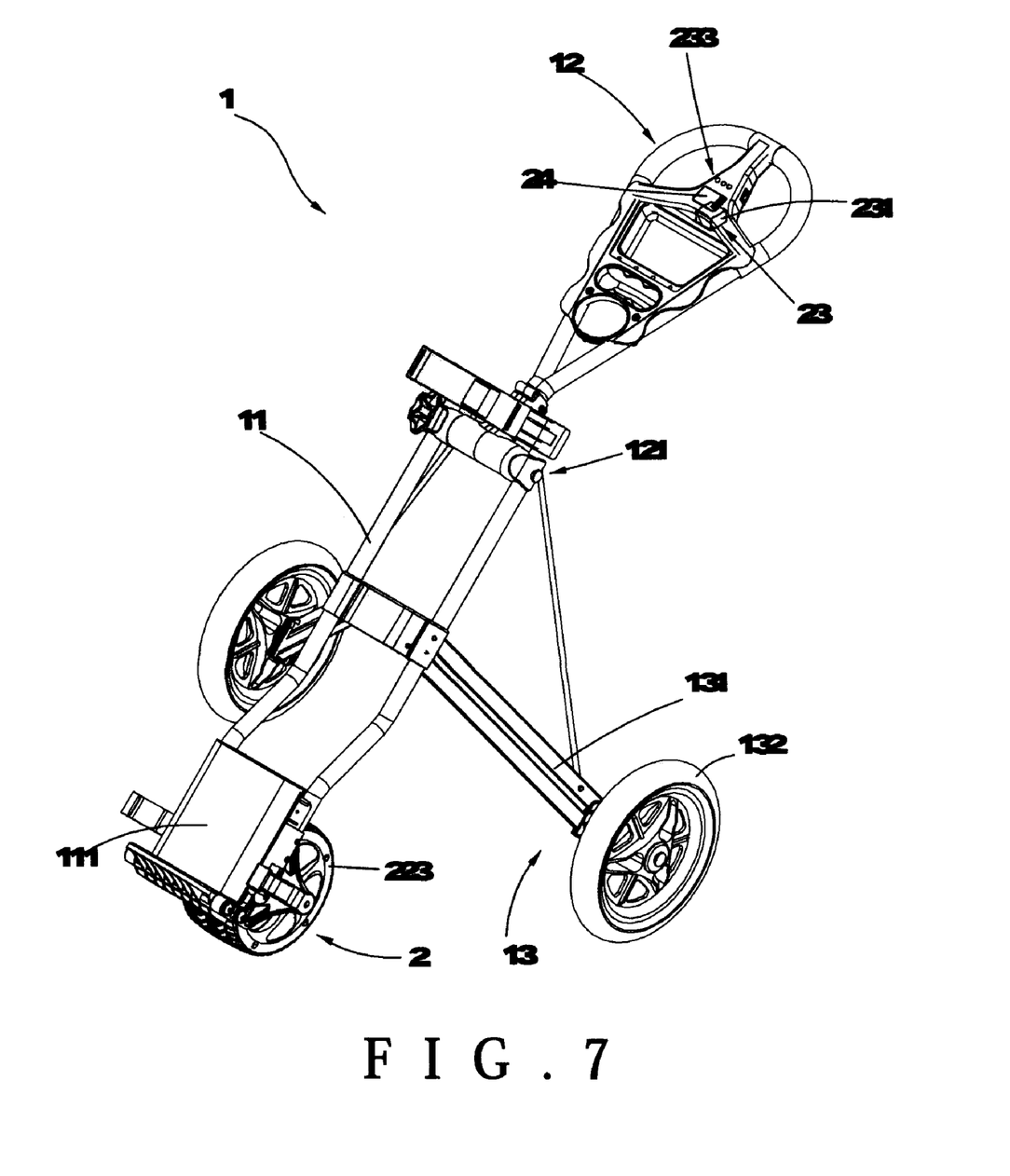
FIG. 7 is a pictorial drawing of the power assisted vehicle according to another preferred embodiment of the present invention.
Figure 8:
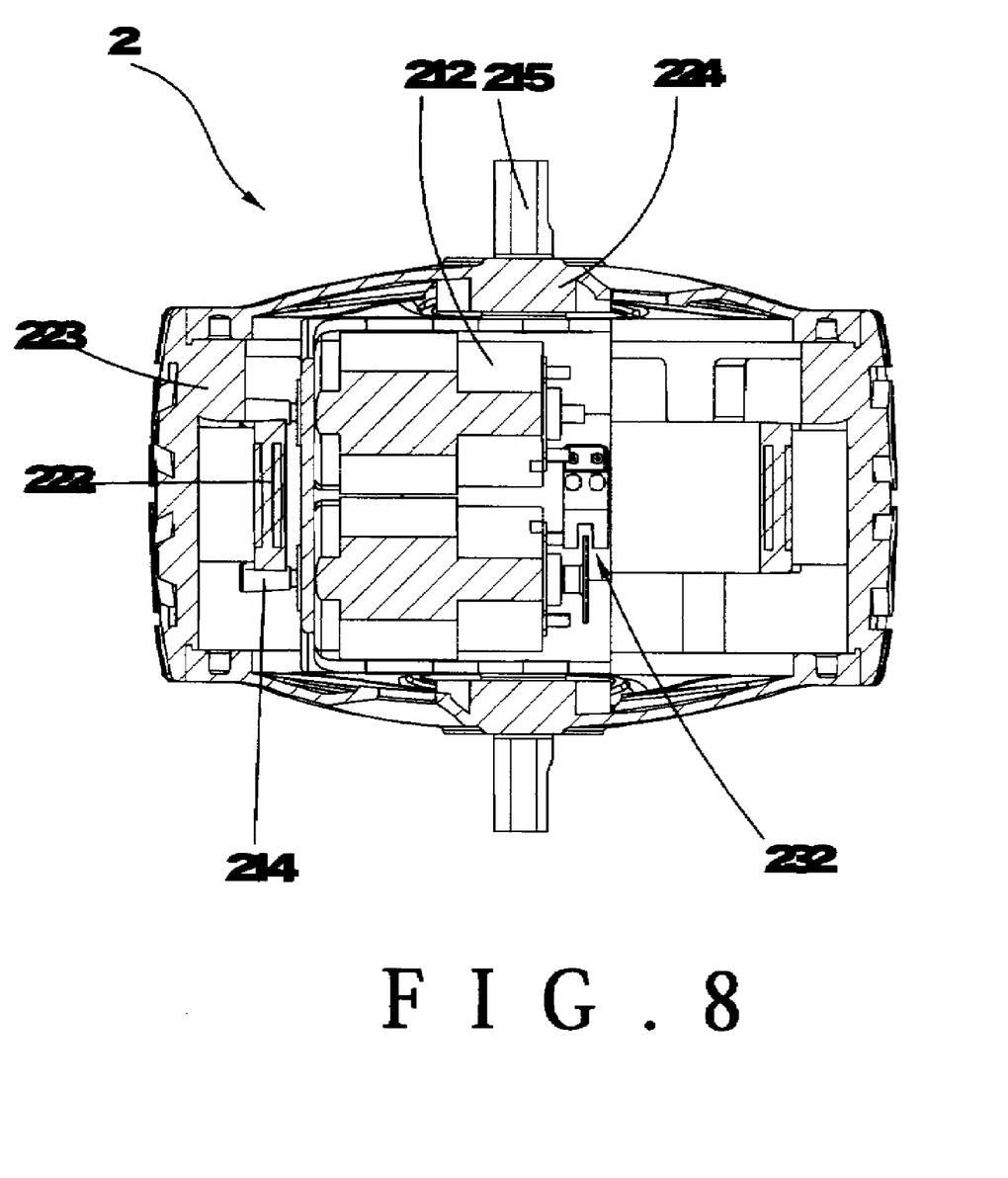
FIG. 8 is a cross-sectional drawing of the auxiliary propelling device according to another preferred embodiment of the present invention.

Referring to FIG. 7 and FIG. 8, a pictorial drawing of the power assisted vehicle 1 according to another preferred embodiment of the present invention is illustrated. The power assisted vehicle 1 comprises a frame body 11, a pushing handlebar 12 pivoted to the frame body 11, a wheel portion 13 disposed on the frame body 11 and an auxiliary propelling device 2. In the embodiment, a processing device 23 is connected to the power sources 212. The processing device 23 having a processing unit 231, and a sensor 232 disposed to a side of the transmission shaft 213 and a controller 233 disposed on the frame body 11, wherein the sensor 232 and the controller 233 are connected to the processing unit 231. The sensor 232 transmits rotational speed data of the transmission shafts 213 to the processing unit 231 for calculation. A screen 24 is added to the frame body 11. The screen 24 is also connected to the processing device 23.

The controller 233 is utilized to set speeds for the power assisted vehicle 1. The screen 24 is also utilized to read data (e.g. current speeds, predetermined speeds, state-of-charge) of the power assisted vehicle 1. When the power assisted vehicle 1 performs self-propelled going forward, a thrust pushes the power assisted vehicle 1 to drive the transmission shafts 213 for rotating. The sensor 232 then detects the rotational speeds of the transmission shafts 213. If the rotational speeds are greater than a predetermined value (1 kilometer per hour, 1 km/hr) in the processing unit 231, the processing unit 231 calculates the minimum voltages and current required for achieving the predetermined rotational speeds of the power sources 212. The voltages and current of the external power 111 are regulated to provide the power sources 212 to drive the transmission shafts 213 for rotating. The tire 223 is then driven to operate the power assisted vehicle 1 to perform self-propelled going forward. When the predetermined speed is achieved gradually, a user does not need to put the thrust. When the power assisted vehicle 1 starts going forward from the stop state, the greater voltages required for activating the power sources 212 are also overcome. The consumption of the external power 111 is then decreased to the minimum.

During operation and use, the power assisted vehicle 1 performs self-propelled going forward as above-mention and if the user puts an auxiliary thrust, the processing unit 231 then calculates and regulates output voltages and amperes of current to improve power saving efficiency for the power assisted vehicle 1. Of course, when the power assisted vehicle 1 faces hillsides or grassland to which the sensor 232 can detect. The processing unit 231 then controls the external power 111 to increase output powers for the power sources 212. The speed is then set at a setting speed. When the power assisted vehicle 1 faces a downhill or flats, the situation is reversed. Once the power assisted vehicle 1 faces a descent without any help, the processing unit 231 controls the external power 111 to output the maximum power for the power sources 212 to keep the setting speed. Once powers are not enough, the current speed is set to be the terminal speed. If the speed is under 1 km/hr, the processing unit 231 stops the operating of the power sources 212, and needs help from users until the speed returns to 1 km/hr, the processing unit 231 then takes over. The aforementioned design may help the power assisted vehicle 1 on the electricity consumption and the service life. By adding the auxiliary propelling device 2, the power assisted vehicle 1 is capable of self-propelled going forward. Energy consumption is then reduced and transmission efficiency is then improved while in use. The service life is also extended substantially.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

We claim:

1. A power assisted vehicle comprising:
   a frame body;
   a pushing handlebar pivoting to said frame body; wherein,
      a positioning member attaching both said frame body and said pushing handlebar, and said pushing handlebar being adjusted by tightening or loosening said positioning member;

a wheel portion having a fastening frame pivoted to said frame body, and having at least two driven wheels disposed on said fastening frame; and an auxiliary propelling device having a transmission portion attached to said frame body and an auxiliary wheel driven by said transmission portion; wherein said transmission portion comprising a supporting base connecting to said frame body, two power sources juxtaposed on said supporting base rotating in an opposite direction when in operation, a transmission shaft protruding from each of said two power sources, and two friction pieces, each with the shape of a cone and disposed to each said transmission shaft; wherein said supporting base having a fastening shaft extending from both sides thereof, and said two power sources having different rotation directions to allow said two friction pieces to have different rotation directions; said auxiliary wheel, driven by said transmission portion and wrapping said supporting base, further comprising a wheel rim disposed around said supporting base, a friction ring fastened to said wheel rim and clamped by said two friction pieces for being driven by said two power sources, which in turn drives said wheel rim, a tire fastened to said wheel rim and said friction ring, and two cover bodies attached to two sides of said wheel rim.

2. The power assisted vehicle as claimed in claim 1, wherein said power sources are attached to a processing device, and said processing device has a processing unit, a sensor secured by the side of said transmission shaft, and a controller disposed on said pushing handlebar and electrically connected to said processing unit; said sensor electrically connected to said processing unit, for receipt of value of rotational speed generated from said transmission shaft and for forwarding said value to said processing unit in calculating optimum rotational speed for said power sources.

3. The power assisted vehicle as claimed in claim 1, wherein said auxiliary propelling device is comprised of more than two transmission portions.

* * * * *